HARRIET A. FARNAM.

Improvement in Bee Hives.

No. 122,242.  Patented Dec. 26, 1871.

ATTEST:
Harry J. Sprague
Myron H. Church

INVENTOR:
Harriet A. Farnam
per Attorney
Thos. S. Sprague

UNITED STATES PATENT OFFICE.

HARRIET A. FARNAM, OF SOUTH BEND, INDIANA.

IMPROVEMENT IN BEE-HIVES.

Specification forming part of Letters Patent No. 122,242, dated December 26, 1871.

*To whom it may concern:*

Be it known that I, HARRIET A. FARNAM, of South Bend, in the county of St. Joseph and State of Indiana, have invented a new and useful Improvement in a Non-Swarming Attachment to Bee-Hives; and I do declare that the following is a true and accurate description thereof, reference being had to the accompanying drawing and to the letters of reference marked thereon and being a part of this specification, in which—

Figure 1:
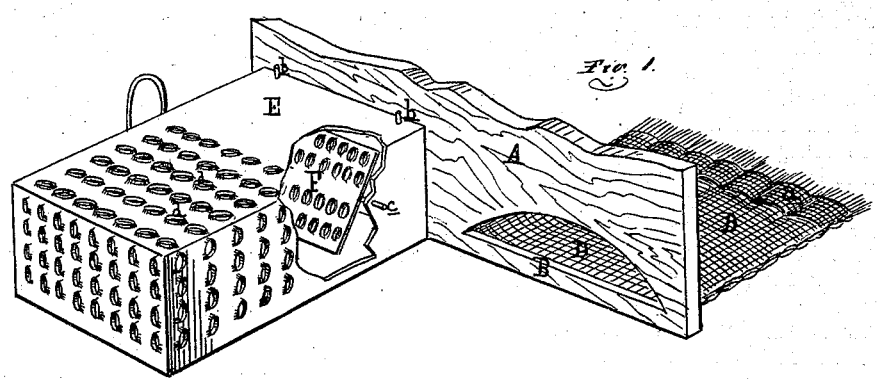
Figure 2:
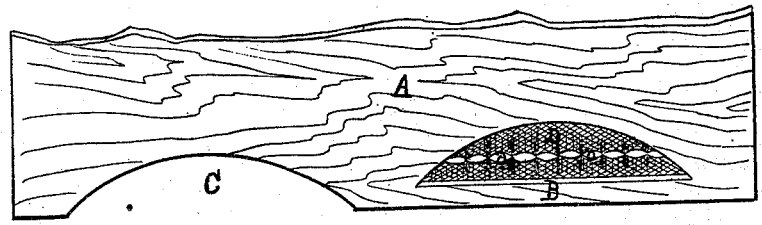
Figure 3:
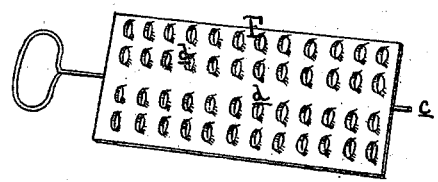

Figure 1 is a perspective view of my device. Fig. 2 is a front elevation, with the queen-trap removed; and Fig. 3 is a perspective view of the trap-valve.

Similar letters of reference indicate corresponding parts in the several figures.

The nature of this invention relates to a device to be attached to a bee-hive to prevent the swarming of the bees therefrom; and it consists, first, in a peculiar entrance-way, of wire-cloth, so arranged that while the bees can freely enter the hive they cannot leave it through the said entrance-way, but are compelled to pass through a separate exit specially provided for them; secondly, in connection with the exit, a detachable sheet-metal trap, perforated with numerous holes, the "burs" made in punching them being on the exterior of the trap, said holes being just large enough to permit the working bees to pass out while the queen and drones will be retained within it, where a similarly-perforated door in the back part of the trap is closed, so that the trap may be detached from the hive, which is then removed and replaced by an empty one, to which the trap is now attached; the bees missing their queen return to the hive which takes the place of the old one, when the queen is allowed to enter the hive and thus retain the bees there.

A represents the lower part of the front of a bee-hive, in which is cut an entrance, B, and exit C, both of considerable width and arched at the top. Surrounding the mouth of the entrance-opening is a sack-like entrance-way, D, composed of wire-cloth, and resting on the bottom of the hive, into which it projects. The wires of this cloth, at the back end, running parallel with the front of the hive are raveled off a half inch or more, and the cloths, upper and lower, wired together at intervals, forming the elliptic openings seen at $a$ in Fig. 2, through which the bees enter the hive, but out through which they cannot pass, by reason of the projecting ends of the raveled wires. E is a sheet-metal trap-box, hung on the hooks $b$, over the exit opening in the hive-front. The inner end of this trap is open, and near it is hung, on a shaft, $c$, the valve or door F, perforated with numerous apertures, $d$, just large enough to permit the working bees to pass out, but not large enough to pass the queen or drones, is hung so as to close or open the entrance to the hive, as desired. The outer portion of the trap is similarly perforated, the perforations being punched from the inner side, so as to leave the bur on the exterior. Ordinarily the door F will be kept open, so as to afford unrestricted exit for the bees, which, of necessity, must pass out through the apertures in the trap. When the bees are swarming, or after they have left the hive, the queen will be found in the trap, vainly endeavoring to pass out. I now close the door F and detach the trap from the hive, which I remove and replace on the stand with an empty hive, on which I place the trap with its inclosed queen; the bees, missing the queen, will soon return to the place where the old hive stood, in obedience to instinct, and then enter the empty hive, after which I open the door in the trap and permit the queen to enter the hive, when the colony is at once domesticated.

Unless some effectual steps were taken to prevent it, that part of the bottom of the hive which is covered by the entrance-way would afford an excellent breeding-place for the moths; I therefore place on the bottom board, under the bottom of the entrance-way, a piece of tarred roofing-felt, which effectually accomplishes the object by destroying the germ of the egg, which is sometimes carried in by the bee, while the odor emitted by the felt repels the miller from the hive.

The perforations in the door should be so made as to present their burs toward the outer end of the trap when the door is closed.

Wire-cloth or other material may be used for the trap, but it is found that the perforated sheet metal is preferable in every respect.

What I claim as my invention, and desire to secure by Letters Patent, is—

1. The removable queen-trap E and valve F, both perforated as described, in connection with the exit C of a hive, as and for the purpose set forth.

2. In a hive provided with the removable queen-trap E, the arrangement of the wire-cloth entrance-way D, fringed or raveled at the back part, and there formed with the openings $a$, as shown and set forth.

HARRIET A. FARNAM.

Witnesses:
 H. G. GEORGE,
 G. PFLEGER, Jr.

(9)